United States Patent Office 3,245,117
Patented Apr. 12, 1966

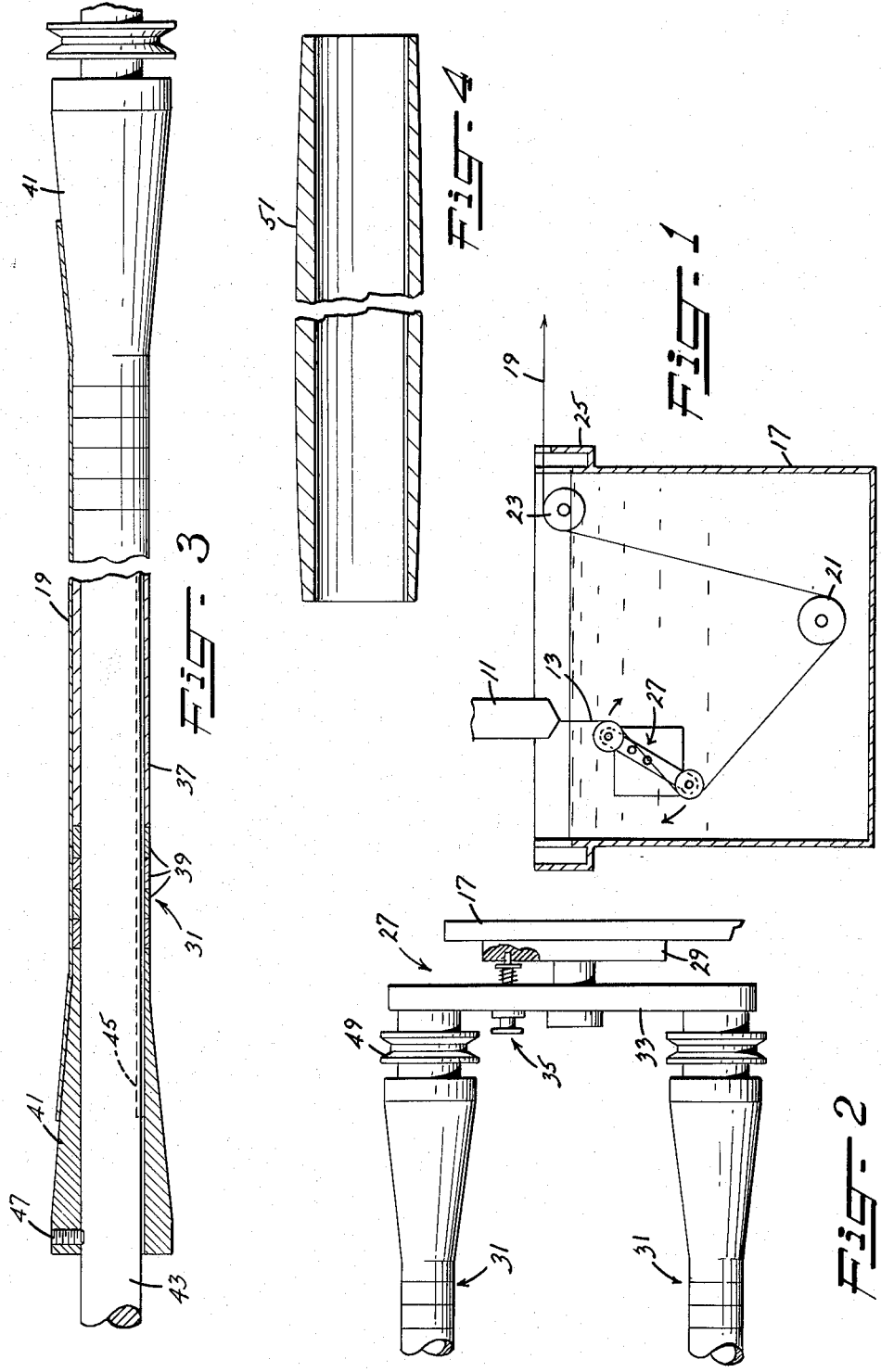

3,245,117
APPARATUS FOR MANUFACTURING CONTINUOUS FILM
Anthony J. Schreiber, Philadelphia, Pa., and Harry W. Sherman, Wilmington, Del., assignors to Avisun Corporation, Philadelphia, Pa., a corporation of Delaware
Filed May 27, 1963, Ser. No. 283,463
2 Claims. (Cl. 18—15)

The present invention relates to apparatus for manufacturing films or webs having improved gauge characteristics.

Flat continuous films or webs formed by conventional extrusion procedures generally exhibit gauge variations across their widths, with usually the film or web edges being thicker than the central portions thereof. Adjustments of the extrusion nozzles to provide orifices which are narrower at their ends, as well as numerous different nozzle designs, have not eliminated or satisfactorily minimized this particular problem.

In view of the gauge variations which are imparted to the films during manufacture, the films become excessively wrinkled and fold upon themselves when collected in roll form, and are often found to be unsuitable for their intended uses. Considerable waste is also encountered in removing the thicker edge portions of the films during final trimming operations. Further, when thermoplastic films or webs formed by such conventional extrusion procedures are subjected to transverse or biaxial stretching operations, the central portions of the films are more rapidly heated and yield more readily to the applied stretching forces. As a result, the stretched film is distorted and exhibits non-uniform molecular orientation.

Additional problems are encountered when a liquid quench or coagulating bath is employed for setting an extruded stream of film-forming material. It has been found that turbulence along and/or within the liquid bath often induces gauge variations along the length of the resulting film or web. Here again, the gauge variations may render the film unsuitable for some intended uses, and in the case of thermoplastic films may prevent or at least complicate stretching operations. Accordingly, a primary object of this invention is to provide a new or generally improved and more satisfactory apparatus for making continuous flat films.

Another object of the invention is the provision of an improved apparatus which is designed to minimize thickness variations across the width of a shaped stream of film-forming material prior to setting of such stream into a film, or web form.

Still another object of the invention is the provision of an extrusion apparatus in which the portion of a continuous traveling shaped stream of film-forming material which is being set or coagulated within a liquid bath is maintained in a taut condition to thereby render the same less sensitive to movements along the bath surface.

Still further objects will appear from the following description.

These objects are accomplished in accordance with the present invention by an apparatus in which longitudinally extending portions of a continuous freshly extruded stream of film-forming material are caused to travel at different rates of speed. In this manner the longitudinally extending portions of such stream are stretched so that variations in thickness across such stream are minimized prior to actual quenching or setting of the same into a film or web form. More particularly, the apparatus includes at least one guide bar which is engaged with resulting film or web and is formed of a series of sleeves of different diameter. The portions of the film which are engaged with sleeves of larger diameter are caused or tend to travel at more rapid rates of speed and thereby exert longitudinal stretching tensions on the trailing portions of the film-forming material which is being extruded.

In a preferred embodiment of the present invention, a pair of such guide bars are mounted between trunnions to provide a tension frame or wiper bar assembly. The trunnions are in turn adjustably supported within a tank for movement in the vicinity of the surface of a contained quenching or coagulating liquid bath. At the start of operations, the tension frame is disposed in a horizontal position, after which a shaped stream of film-forming material is extruded downwardly in between the guide bars and into the liquid bath where it is quenched or set into a film or web form. The frame is then adjusted so that the guide bars engage snugly with opposite sides of the resulting film or web and is locked in adjusted position. The portion of the film or web traveling between the guide bars of the tension frame, as well as the shaped stream being extruded, are maintained in a generally taut condition thus rendering the latter less sensitive to turbulence along or within a liquid bath.

Preferably the guide bars or rolls are of annular construction so that they present surface contours which are the same regardless of the positions to which such bars are adjusted. For example, with a generally flat stream of film-forming material having enlarged edge portions, as produced by a conventional extrusion nozzle, the guide bar employed may be of double concave contour, when viewed in longitudinal cross-section, and would include at least one central sleeve, which is of substantially uniform diameter throughout its length, and tapered end sleeves.

Desirably, the guide bars or rolls may be driven by the movement of the film which is being formed, or alternatively, by separate means positively driven at speeds substantially equal to or greater than the rate at which the film-forming material is being extruded.

In the drawing:
FIGURE 1 is an end view of a preferred embodiment of the apparatus of the present invention;
FIGURE 2 is a fragmentary front view of a portion of the apparatus shown in FIGURE 1;
FIGURE 3 is a front view of a guide bar employed in the apparatus illustrated in FIGURES 1 and 2, with a portion thereof shown in section; and
FIGURE 4 is a longitudinal section of an element of the apparatus employed in another embodiment of the vention.

With reference to FIGURE 1 of the drawing, 11 indicates a conventional nozzle which is designed to extrude a continuous and generally flat stream 13 of film-forming material, as for example molten polyethylene or polypropylene. A quenching or coagulating liquid bath 15, such as cool water, is continued within a tank 17 and serves to chill or set the shaped stream 13 into the form of a film or web. The tank 17 is also of known construction and includes a roller 21 for reversing the path of the film 19 and directing the same to a roller 23 which assists in advancing the film to a collecting means, not shown. Preferably, the bath 15 is continuously circulated by suitable means, not shown, with the bath overflow being collected for discharge within a trough 25.

In accordance with the preferred embodiment of the present invention, a tension frame or wiper bar assembly 27 is pivotally supported within the tank 17 in the vicinity but below the surface of the bath 15, by brackets 29. The tension frame 27 includes at least one, and desirably a pair of guide bars 31 supported between trunnions 33 and means 35 for locking the frame in adjusted position. At the start of operations, the stream 13 is extruded downwardly in between the guide bars 31 after which the frame is adjusted into a position as shown in FIGURE 1.

The guide bars 31 of the specific embodiment illustrated are designed to minimize thickness variations across the width of a shaped stream of film-forming material which, when extruded, normally exhibits thicker longitudinal edge portions. To achieve this purpose, the bars 31 each include a long sleeve 37, a series of short or spacer sleeves 39, tapered end sleeves 41 and a supporting shaft 43. All of the sleeves are fixed against rotation by a key 45 and locked against longitudinal movement by set screws 47 threaded through the end sleeves 41.

The tapered end sleeves 41 cause the edge portions of the film 19 which are engaged therewith to travel at a more rapid rate of speed than the remainder of the film. As a result, longitudinal tensions are transmitted rearwardly and react upon the yieldable or plastic edge portions of the shaped stream of film-forming material 13 to thereby stretch the same. The edge portions of the stream 13 become thinner as they are stretched, so that thickness variations between the center and edges of the stream are eliminated or minimized before actual quenching or setting takes place.

It will of course be apparent that the rate of speed at which any particular portion of the film is advanced is directly proportional to the diameter of the guide bar sleeve with which such film portion is engaged. Thus by moving the tapered end sleeves 41 laterally of the film as by employing spacer sleeves 39 of different lengths, the film edge portions may be engaged with larger or smaller diameter sections thereof and thereby be adjusted to travel at speeds necessary for achieving the desired degree of stretch.

The guide bars 31 are preferably in the form of rolls which may be rotated relative to the trunnions 33 by the movement of the film itself, or by pulleys 49 from some independent means, not shown. With the latter arrangement, the bars or rolls 31 may be driven at speeds substantially equal to the rate at which the stream 13 is extruded, or at a slightly faster speed to effect a drawdown of the stream and perhaps some molecular orientation in the extruded material.

As illustrated in FIGURE 3, the rolls or bars 31 are of double convex configuration, when viewed in longitudinal section, since the tapered sleeves are located at the ends thereof, in position to cause the thicker edge portions of an extruded stream to be tensioned or stretched in a longitudinal direction. It will of course be understood that with extruded streams of film-forming material having different cross-sectional configurations from that discussed above, the shapes and positions of the guide bar sleeves will also have to be varied to attain the desired stretching of the thicker portions of such streams. For example, with a stream of film-forming material having a central portion which is thicker than the edges thereof, the guide bar 31 employed may include a double tapered sleeve, as shown at 51 in FIGURE 4, taken along or with one or more cylindrical sleeves such as shown at 39.

It is to be understood that changes and variations may be made without departing from the spirit and scope of the invention as defined in the appended claims.

We claim:

1. Apparatus for making a continuous film having improved gauge characteristics including means for extruding a continuous stream of film-forming material having a longitudinally extending enlarged portion, a tank for containing a liquid bath for setting the extruded stream into a film, means for advancing the film through and outwardly from said tank, a tension frame supported within said tank below the surface of the liquid bath for pivotal movement about an axis substantially parallel to the plane of the film which is being formed, and means for locking said frame in an adjusted position, said tension frame including a pair of rolls, said rolls being mounted on opposite sides of the tension frame pivot axis so as to engage with the opposite sides of the film when the frame is moved into an adjusted position whereby it tensions and restrains the film and the extruded stream against deflection by movement of the liquid bath, said rolls each having at least one cylindrical section and at least one gradually tapered section having a minimum diameter which is substantially equal to that of said cylindrical section and abuts with an end thereof, said tapered roll section being aligned longitudinally with the enlarged portion of the extruded stream of film-forming material so that the portion of the film which is engaged with said tapered roll sections moves at faster rate of speed than other adjacent portions thereof to thereby cause the enlarged portion of the stream to be stretched and reduced in thickness before being quenched in the liquid bath.

2. Apparatus as defined in claim 1 further including means for positively rotating said rolls at a speed at least equal to the rate of extrusion of the stream of film-forming material.

References Cited by the Examiner

UNITED STATES PATENTS

| | | | |
|---|---|---|---|
| 2,838,800 | 6/1950 | Hertz | 264—178 |
| 2,920,352 | 1/1960 | Miller et al. | 264—210 |
| 3,052,917 | 9/1962 | Horn | 264—178 |

J. SPENCER OVERHOLSER, *Primary Examiner.*

ALEXANDER H. BRODMERKEL, WILLIAM J. STEPHENSON, *Examiners.*